(12) United States Patent
Rosen

(10) Patent No.: US 12,478,035 B2
(45) Date of Patent: Nov. 25, 2025

(54) DOMED PET HOUSING WITH PANELED CONSTRUCTION

(71) Applicant: Jeffrey H. Rosen, Aventura, FL (US)

(72) Inventor: Jeffrey H. Rosen, Aventura, FL (US)

( * ) Notice: Subject to any disclaimer, the term of this patent is extended or adjusted under 35 U.S.C. 154(b) by 0 days.

(21) Appl. No.: 18/865,228

(22) PCT Filed: May 12, 2023

(86) PCT No.: PCT/US2023/022117
§ 371 (c)(1),
(2) Date: Nov. 12, 2024

(87) PCT Pub. No.: WO2023/220422
PCT Pub. Date: Nov. 16, 2023

(65) Prior Publication Data
US 2025/0107502 A1     Apr. 3, 2025

Related U.S. Application Data

(60) Provisional application No. 63/341,877, filed on May 13, 2022.

(51) Int. Cl.
*A01K 1/03*     (2006.01)
*A01K 1/035*     (2006.01)

(52) U.S. Cl.
CPC ............ *A01K 1/033* (2013.01); *A01K 1/0353* (2013.01)

(58) Field of Classification Search
CPC ........ A01K 1/033; A01K 1/0353; A01K 1/03; A01K 1/034; A01K 1/035
See application file for complete search history.

(56) References Cited

U.S. PATENT DOCUMENTS

| 3,147,736 | A |   | 9/1964  | Daniel |
|-----------|---|---|---------|--------|
| D205,749  | S |   | 9/1966  | Moss |
| D244,949  | S |   | 7/1977  | Welker |
| 4,161,924 | A |   | 7/1979  | Welker |
| D257,493  | S |   | 11/1980 | Lodrick |
| D269,916  | S |   | 7/1983  | Lodrick |
| 4,852,598 | A | * | 8/1989  | Griesenbeck ........... E04H 15/56 5/494 |
| D317,665  | S |   | 6/1991  | Marshall |

(Continued)

FOREIGN PATENT DOCUMENTS

| CN | 308030399   | 5/2023 |
| GB | 2441047     | 2/2008 |
| KR | 20210001125 | 1/2021 |

OTHER PUBLICATIONS

PCT International Search Report for PCT/US2023/022117 entitled "Domed Pet Housing With Paneled Construction" mailed on Aug. 18, 2023, 2 pages.

(Continued)

*Primary Examiner* — Trinh T Nguyen
(74) *Attorney, Agent, or Firm* — Clark Hill PLC

(57) ABSTRACT

A pet housing (10) is made from a series of panels (16) arranged around a cushion-like animal bed (26) to form a generally dome-shaped enclosure (20). An entrance (12) in the enclosure (20) allows for the ingress/egress of a pet animal. For visual aesthetics, the pet housing (10) can assimilate a sports ball through placement and presentation of seams (20) or an animal's head via use of various attachable/removable accouterments (40) (FIG. 8).

20 Claims, 9 Drawing Sheets

(56) References Cited

U.S. PATENT DOCUMENTS

| | | | |
|---|---|---|---|
| 5,072,694 A | 12/1991 | Haynes | |
| D326,495 S | 5/1992 | Pearce | |
| D340,073 S | 10/1993 | Turner | |
| D360,709 S | 7/1995 | Northrop et al. | |
| D377,545 S | 1/1997 | Iben | |
| D426,923 S | 6/2000 | Chrisco | |
| D429,544 S | 8/2000 | Terry, III | |
| 6,564,394 B2 | 5/2003 | Falwell | |
| D514,747 S | 2/2006 | Bertoli | |
| D560,742 S | 1/2008 | Bernart | |
| D560,743 S | 1/2008 | Bernart | |
| D591,459 S | 4/2009 | Melerine | |
| D607,610 S | 1/2010 | Higashi | |
| D608,057 S | 1/2010 | Zagar | |
| D612,546 S | 3/2010 | Zine | |
| D616,159 S | 5/2010 | Zagar | |
| D626,702 S | 11/2010 | Sacher | |
| D676,613 S | 2/2013 | Chiu | |
| 8,662,014 B1 * | 3/2014 | Harrell | A01K 1/0353 119/28.5 |
| D706,491 S | 6/2014 | Bratton et al. | |
| D706,492 S | 6/2014 | Bratton et al. | |
| D773,749 S | 12/2016 | Itzhak-Sigron | |
| D780,382 S | 2/2017 | Scariot | |
| D793,629 S | 8/2017 | Gates | |
| D815,365 S | 4/2018 | Scariot | |
| D828,640 S | 9/2018 | Comerford | |
| D835,355 S | 12/2018 | Gansbuhler | |
| D876,565 S | 2/2020 | Iqbal et al. | |
| D896,336 S | 9/2020 | Alemdar | |
| D909,527 S | 2/2021 | Alemdar | |
| D914,303 S | 3/2021 | Tulhill et al. | |
| D927,793 S | 8/2021 | Valla | |
| D988,454 S | 6/2023 | Chen | |
| D1,005,602 S | 11/2023 | Gao | |
| D1,008,571 S | 12/2023 | Yun | |
| D1,011,463 S | 1/2024 | Zhang | |
| D1,027,318 S * | 5/2024 | Rosen | D30/118 |
| 2006/0272581 A1 | 12/2006 | Dunn et al. | |
| 2007/0199518 A1 | 8/2007 | Siemer | |
| 2011/0226190 A1 * | 9/2011 | Lamontagne | A01K 1/033 119/482 |
| 2017/0096825 A1 | 4/2017 | Bree | |
| 2017/0118950 A1 | 5/2017 | Xu | |
| 2021/0153450 A1 * | 5/2021 | Paxson | A01K 1/0058 |
| 2024/0237617 A1 * | 7/2024 | Jones | A01K 15/027 |

OTHER PUBLICATIONS

PCT Written Opinion for PCT/US2023/022117 entitled "Domed Pet Housing With Paneled Construction" mailed on Aug. 18, 2023, 7 pages.

Maccabi Art Soccer, available in Amazon.ca, date first available Jan. 21, 2023 [online], [site visited Jul. 10, 2023], Available from the internet URL: https://www.amazon.ca/MACCABI-ART-Baseball-Sport-Small/BOBPBQWQF2?th=1 (Year: 2023).

* cited by examiner

DOMED PET HOUSING WITH PANELED CONSTRUCTION

CROSS-REFERENCE TO RELATED APPLICATIONS

This application is a U.S. PCT National Phase entry under 35 U.S.C. 371 of International Patent Application No. PCT/US2023/022117 filed May 12, 2023, which claims priority to U.S. Provisional Patent Application Ser. No. 63/341,877 filed May 13, 2022, the entire disclosures of both of which are incorporated herein by reference.

FIELD OF THE INVENTION

The present invention relates to pet products and, more particularly, to pet housings that can house a pet for purposes of sleep, or for fostering a feeling of security or reducing anxiety in a pet.

BACKGROUND OF THE INVENTION

Pet animals often enjoy having their own bedding in a variety of forms. Conventional products include open beds that can be flat or generally circular, as well as beds that provide one or more protective barriers or walls, which certain dogs and cats may like. Additionally, pet owners are always looking for new products with unique shapes, colors and other visual touches that they and the pet alike can enjoy.

SUMMARY OF THE INVENTION

A dome-shaped pet housing has a multi-panel construction, with an entrance disposed in one of its slice-like pieces for ingress/egress. The shape and configuration of the pet housing can assimilate a sports ball, such as a baseball or a basketball. To this end, seams holding the panels together can correspond to the placement of laces, seams or grooves on the equivalent ball object, or they can be distinct therefrom. A permanent or removable animal bed may be disposed within an inner chamber of the pet housing.

In one embodiment, the pet housing includes an animal bed adapted to be supported on a floor or similar surface. This is complemented with a plurality of identical panels projecting from the animal bed and converging at an apex point to thereby form a roof above the animal bed. The panels and animal bed cooperate to form a generally hemispherical enclosure having an inner chamber adapted to house a pet animal. Each of the panels has an arcuate base extending laterally proximate the animal bed, a first longitudinal edge extending, along an arc, from one lateral end of the base to the apex point, as well as a second longitudinal edge extending, along an arc, from an opposite lateral end of the base to the apex point. A first means, such as stitching, can join adjacent pairs of panels to each other, while a second means, such as stitching, can join the panels to the animal bed. An opening can be disposed in the enclosure that is adapted to allow the ingress and egress of a pet animal.

In some embodiments, a printed pattern is provided on the enclosure. This printed pattern might assimilate a sports ball. For added utility, the printed pattern can have a tactile feel reminiscent of a sports ball (e.g., basketball grooves and/or dimpling). To this end, the pet housing can contain seams (e.g., from sewing) that are placed and oriented to imitate similar elements on actual sports balls. The seams could assimilate grooves, seams, laces, etc., depending on the type of ball chosen. Furthermore, the pet housing itself can be sized and shaped to assimilate a sports ball.

In some embodiments, the opening to the inner chamber of the pet housing can be defined by a hole in one of the panels. More specifically, the opening can divide one panel into a first section adjacent to the animal bed and a second section adjacent to the apex point. The opening could also be formed by a void between a pair of panels.

The animal bed, which could include an optional cushion, could also be removable and/or replaceable from the enclosure, such that it can be interchanged with other animal beds. In further embodiments, the animal bed and/or its associated cushion could be scented.

The pet housing could have a total of five identical panels arranged seriatim around the animal bed. In an embodiment, the animal bed would be round and the enclosure would be generally dome-shaped.

In other embodiments, the enclosure can resemble an animal head. In such embodiments, the animal bed and/or its associated cushion can be sized and shaped to resemble a tongue of an animal. The animal bed itself could also be removable and/or replaceable from the animal head-shaped enclosure, or it could be permanently located within the enclosure.

In some embodiments, indicia could be disposed on outer and/or inner surfaces of the panels. As an added novelty feature, the indicia could resemble a pre-selected animal (e.g., the same type of animal as the intended inhabitant of the pet housing) or can reflect a pet's name. For instance, each of the panels can have a curved outer surface on one side thereof and a curved inner surface on an opposite side thereof, wherein at least one of the panels has the indicia thereon.

For further appeal, the pet housing could be provided as part of a kit that includes detachable and/or replaceable accouterments for placement on the enclosure, including on the outer and inner surfaces of the panels thereof. These accouterments could be animal-themed and assimilate the features of the pre-selected animal referenced above. For instance, the accouterments can include nose, eye, ear, fur and/or tail features of the animal. Similarly, such accouterments could be applied to a ball-themed pet housing as well. The ball-themed accouterments may vary from simple logos to more complex decorations (e.g., facial and uniform/hat features) adapted to mimic the look of a sports mascot, such as the "Mr. Met" mascot for the N.Y. Mets baseball team.

In an embodiment, the animal bed is made of a durable material appropriate for contact with the ground, while the dome-shaped enclosure is made from a material that permits the enclosure to be deformable and/or collapsible for storage or transport purposes. The panels can be made of a variety of materials, such as rubber, polymer, fabric, etc., depending upon whether the enclosure is deformable and/or collapsible or not.

In an embodiment of the present invention, a pet housing could be made by first providing an animal bed adapted for placement on a floor or other support surface. Then a plurality of panels can be provided and arranged in seriatim on the animal bed so as to form a generally hemispherical (i.e., dome-shaped) enclosure having an inner chamber adapted to house a pet animal. Adjacent panels can be attached to each other by stitching or any other known means of attachment. In a similar fashion, the panels can be attached to the animal bed to form the aforementioned dome-shaped enclosure.

BRIEF DESCRIPTION OF THE DRAWINGS

For a more complete understanding of the present invention, reference is made to the following detailed description of various representative embodiments considered in conjunction with the accompanying drawings, in which.

DETAILED DESCRIPTION OF VARIOUS EMBODIMENTS

Figure 1:
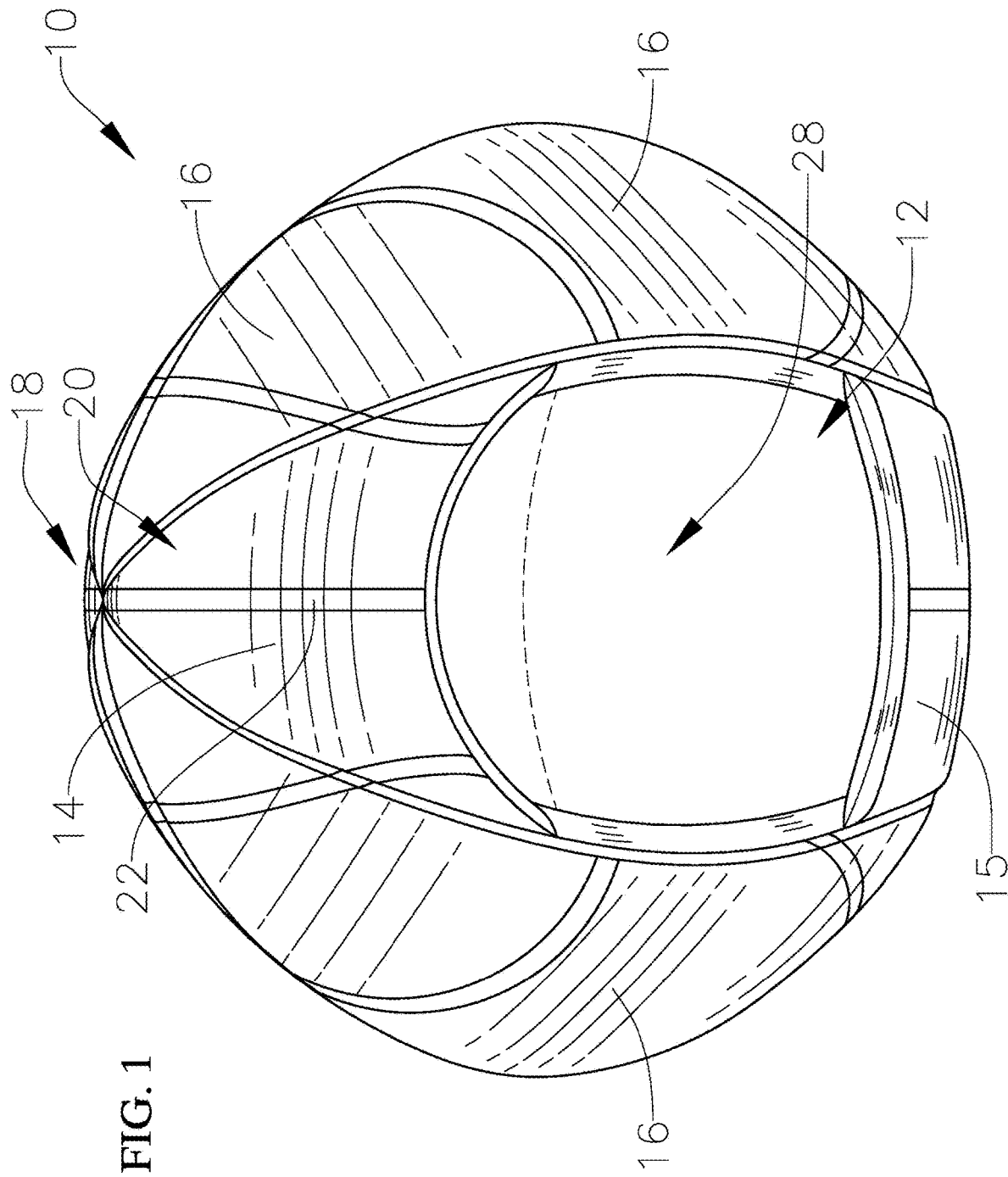
FIG. 1 is a front perspective view of a pet housing constructed in accordance with an embodiment of the present invention.
Figure 2:
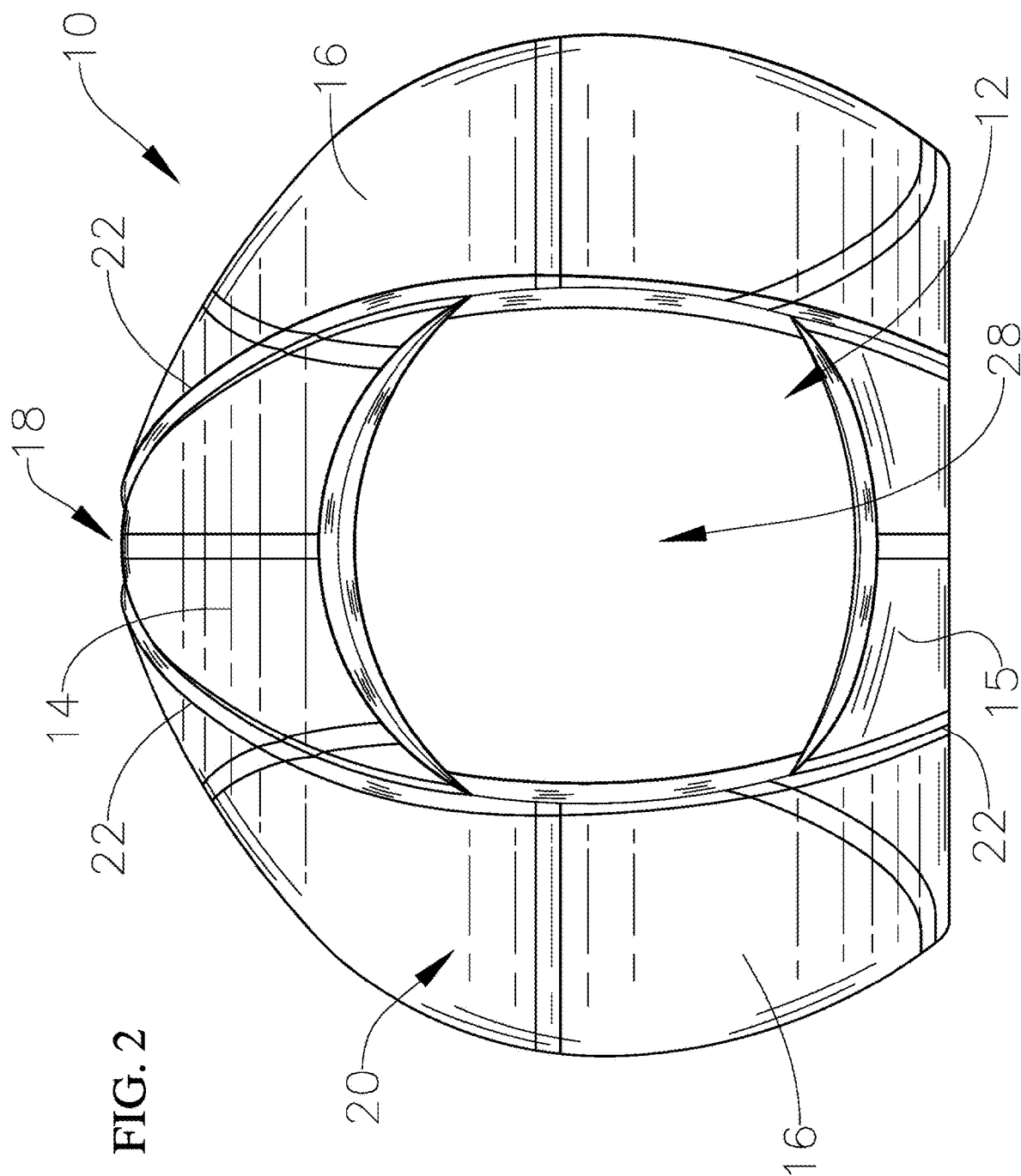
FIG. 2 is a front elevational view of the pet housing constructed in accordance with the embodiment of FIG. 1.
Figure 3:
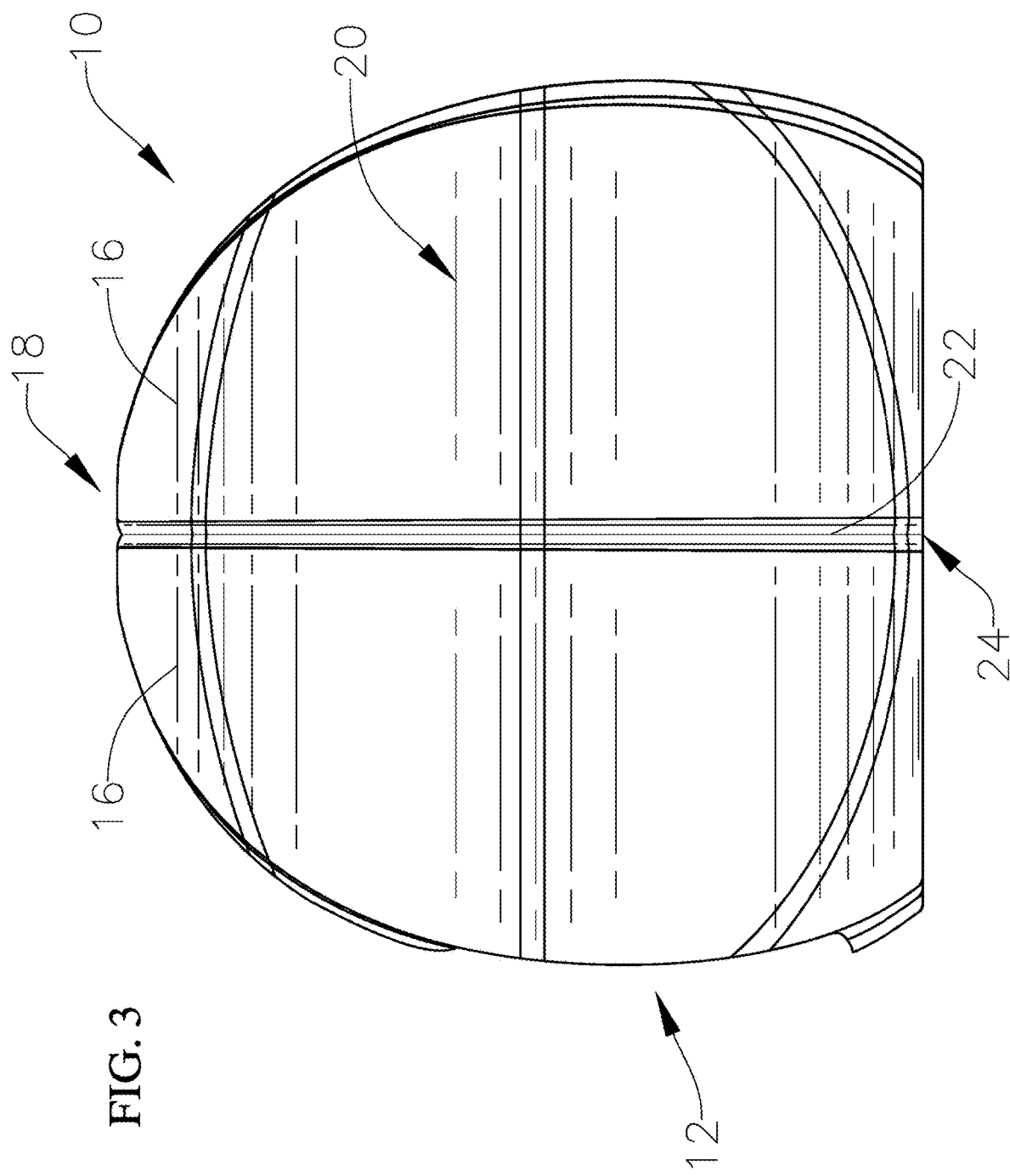
FIG. 3 is a left-side elevational view of the pet housing constructed in accordance with the embodiment of FIG. 1.
Figure 4:
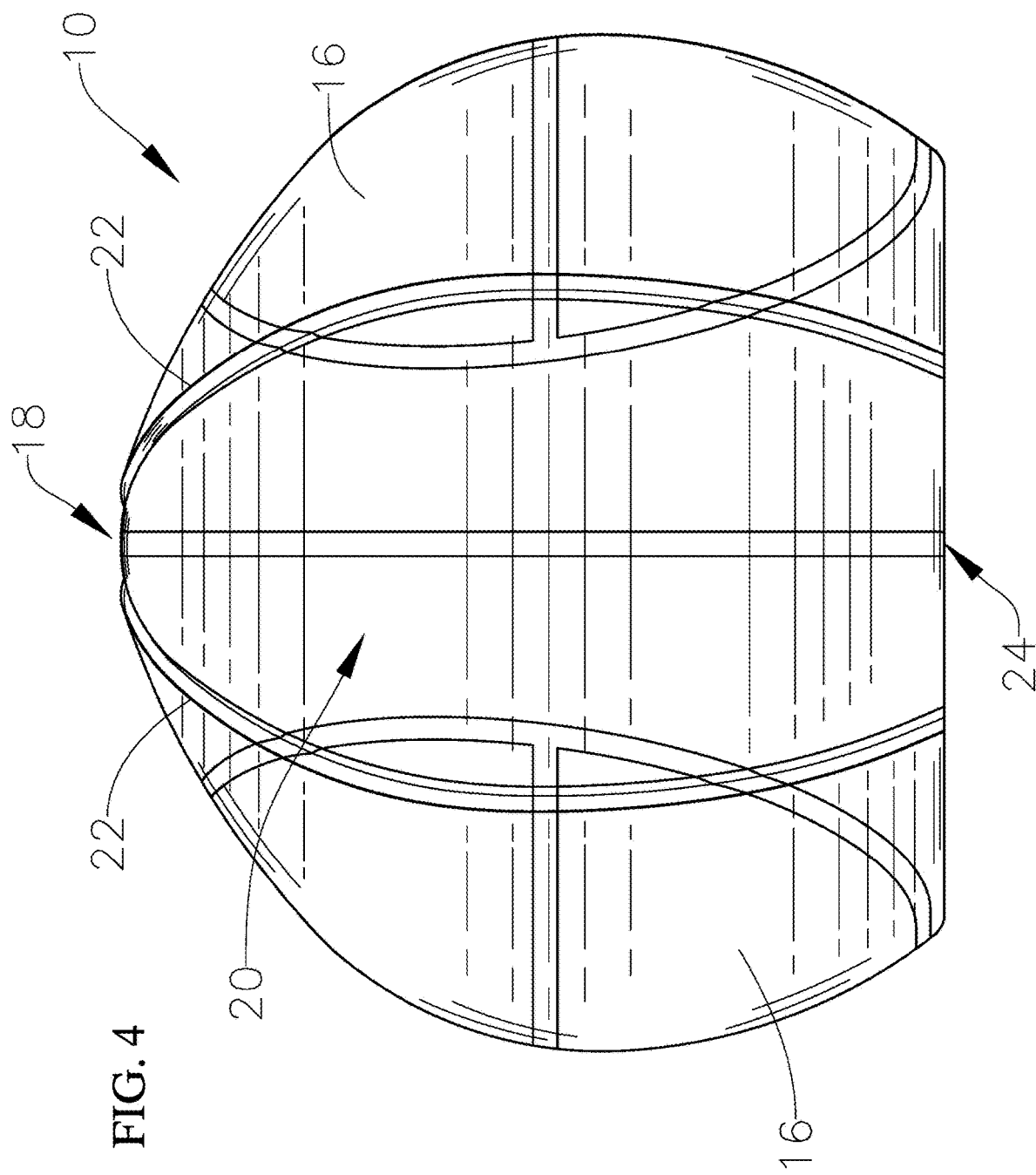
FIG. 4 is a back elevational view of the pet housing constructed in accordance with the embodiment of FIG. 1.
Figure 5:
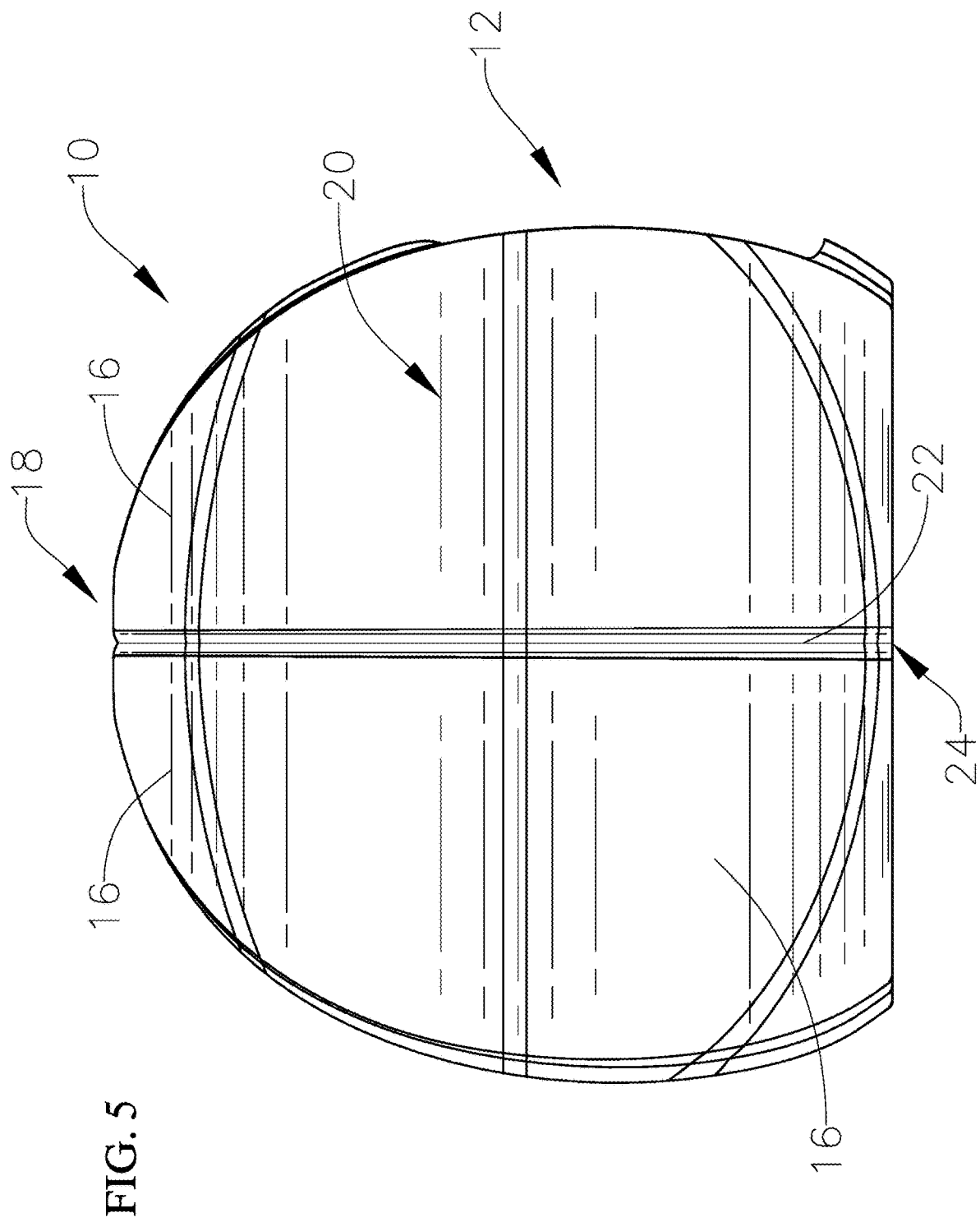
FIG. 5 is a right-side elevational view of the pet housing constructed in accordance with the embodiment of FIG. 1.
Figure 6:
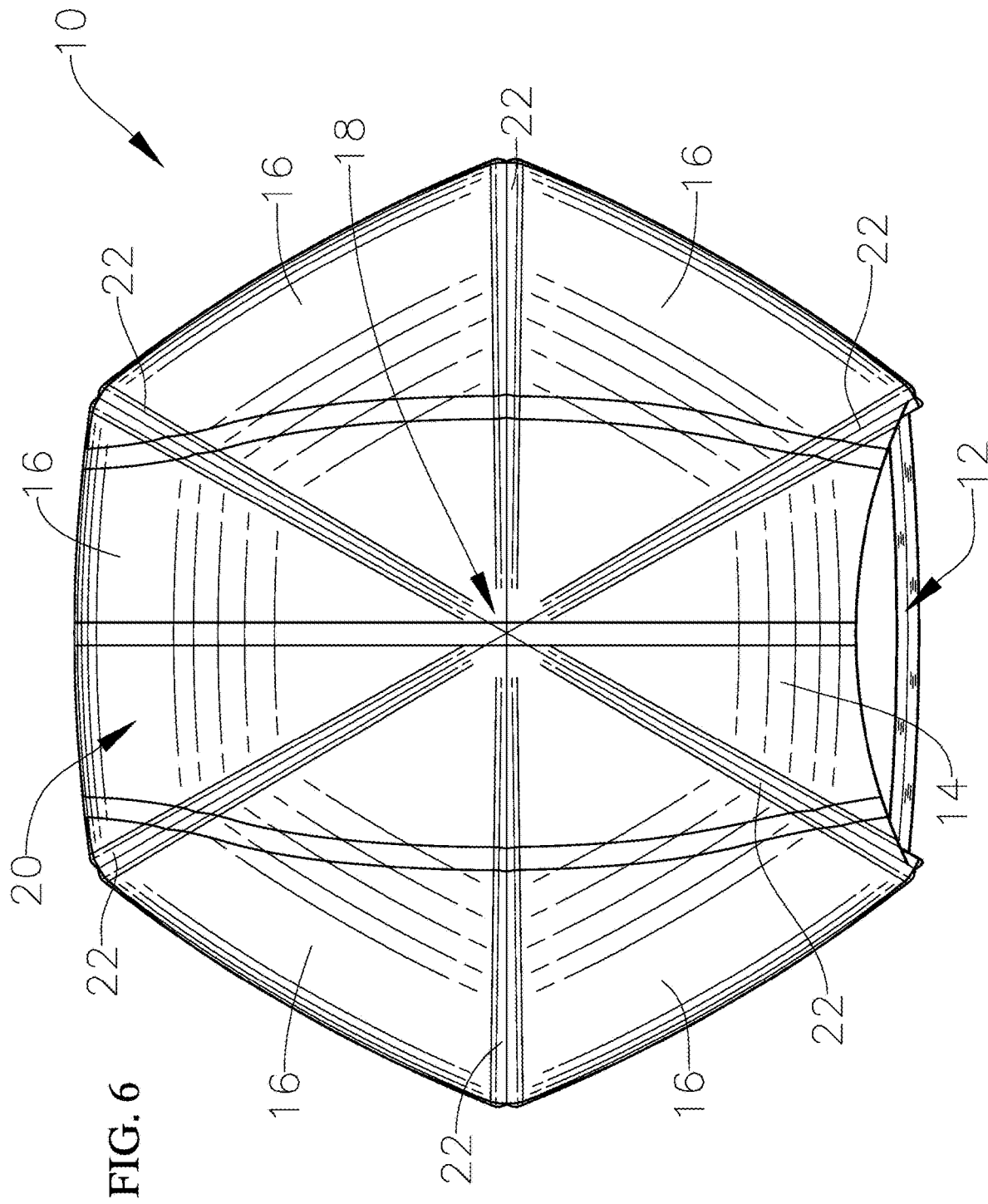
FIG. 6 is a top plan view of the pet housing constructed in accordance with the embodiment of FIG. 1.
Figure 7:
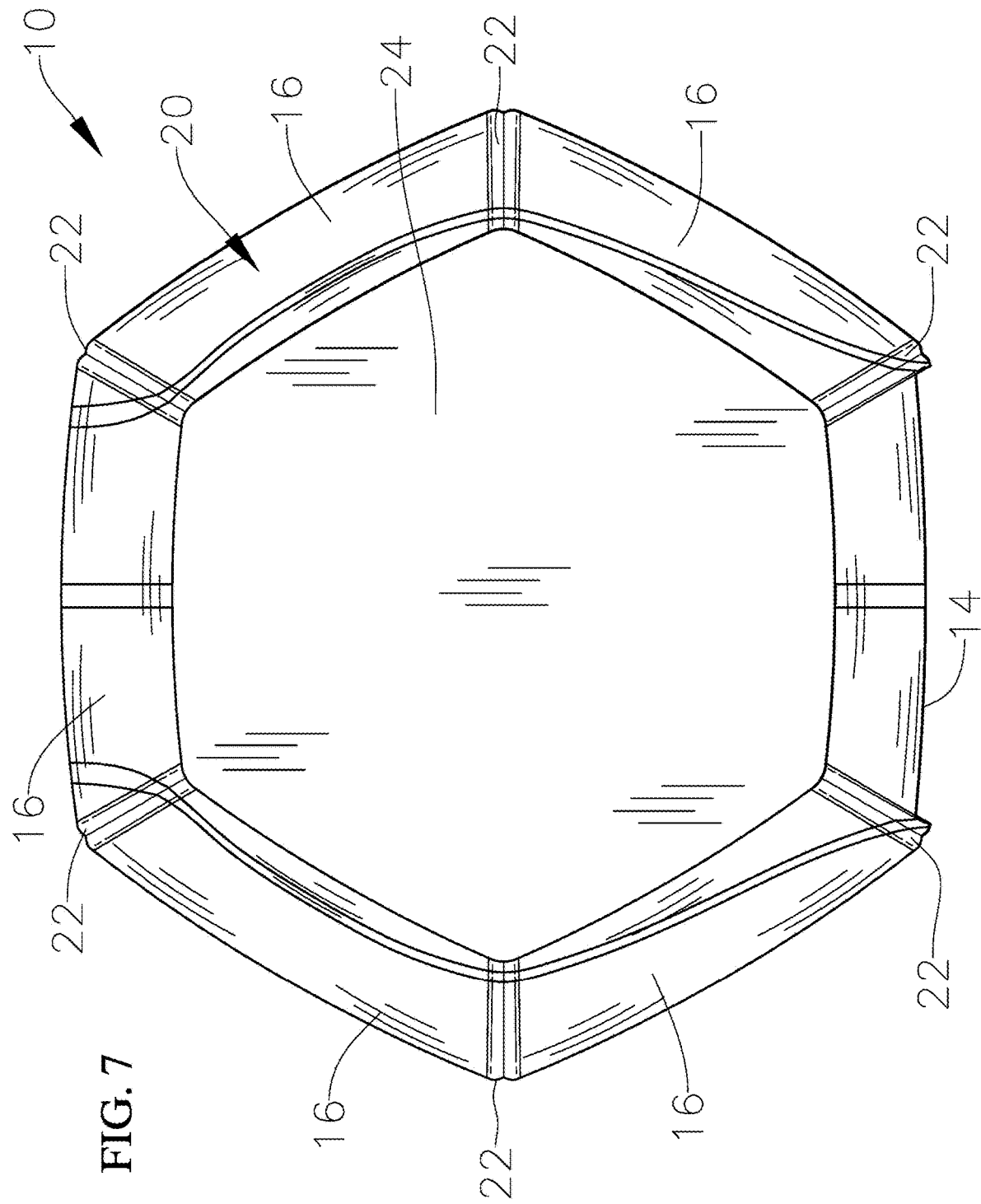
FIG. 7 is a bottom plan view of the pet housing constructed in accordance with the embodiment of FIG. 1.

Embodiments will now be discussed in more detail referring to the drawings that accompany the present application. In the accompanying drawings, various embodiments are illustrated. It is to be understood, however, that these embodiments are merely illustrative of the invention, which can be embodied in various forms. In addition, the specific features of the illustrated embodiments are intended to be illustrative, and not restrictive. Further, the figures are not necessarily to scale, and some features may be exaggerated to show details of particular components with the understanding that sizes, materials and similar details shown in the figures are intended to be illustrative and not restrictive. Therefore, specific structural and functional details illustrated in the accompanying drawings are not to be interpreted as limiting, but merely as a representative basis for teaching one skilled in the art how to make and use the embodiments disclosed and illustrated herein.

Subject matter will also be described in the following text with reference to the accompanying drawings. The subject matter described hereinafter may, however, be embodied in a variety of different forms and, therefore, such subject matter should not be construed as being limited to any of the exemplary embodiments described herein. Among other things, for example, the disclosed subject matter may be embodied in the form of methods, devices, components, systems and/or combinations thereof. The following detailed description is, therefore, not intended to be taken in a limiting sense.

Throughout the Specification, terms may have nuanced meanings suggested or implied in context beyond an explicitly stated meaning. Likewise, the phrase "in one embodiment" as used herein does not necessarily refer to the same embodiment and the phrases "in another embodiment" and "other embodiments" as used herein do not necessarily refer to a different embodiment. It is intended, for example, that the disclosed subject matter includes combinations of the exemplary embodiments, in whole or in part.

In general, terminology may be understood, at least in part, from usage in context. For example, terms, such as "and," "or," or "and/or," as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

With the foregoing prefatory comments in mind, what follows is a detailed description of various exemplary embodiments. Referring now to the various views of FIGS. 1-9, a new type of pet housing 10 has a generally domed shape with an open mouth (i.e., entrance) 12 sized, shaped and located to allow for a pet to enter and exit the pet housing. The entrance 12 is formed in a curved upper front panel 14 in conjunction with a lower front panel 15. In an alternate embodiment, the upper front panel 14 and lower front panel 15 can be replaced by a single-piece front panel having an opening that frames the entrance 12. The front panel 14 along with five side panels 16 (pictured individually in FIG. 8) converge at a top end 18 of the pet housing 10 and define an outer or exterior surface 20 of the pet housing 10. The panels 16 also define an inner surface (not shown) of the pet housing 10. The panels 14, 15 and 16 are stitched or otherwise permanently attached to one another without leaving gaps in the outer surface 20 of the pet housing 10.

Figure 8:
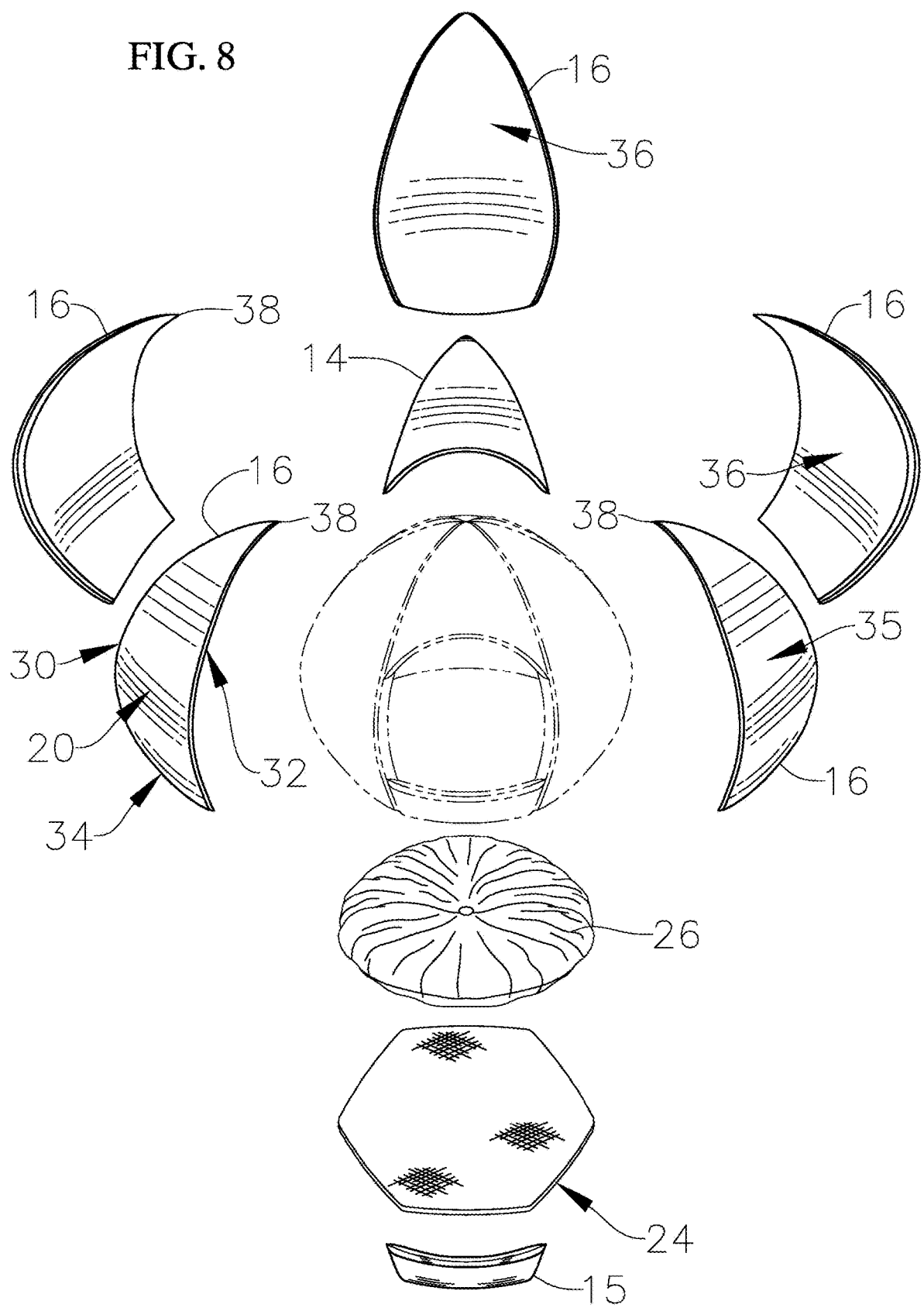
FIG. 8 is an exploded view of the pet housing of FIGS. 1-7.
Figure 9:
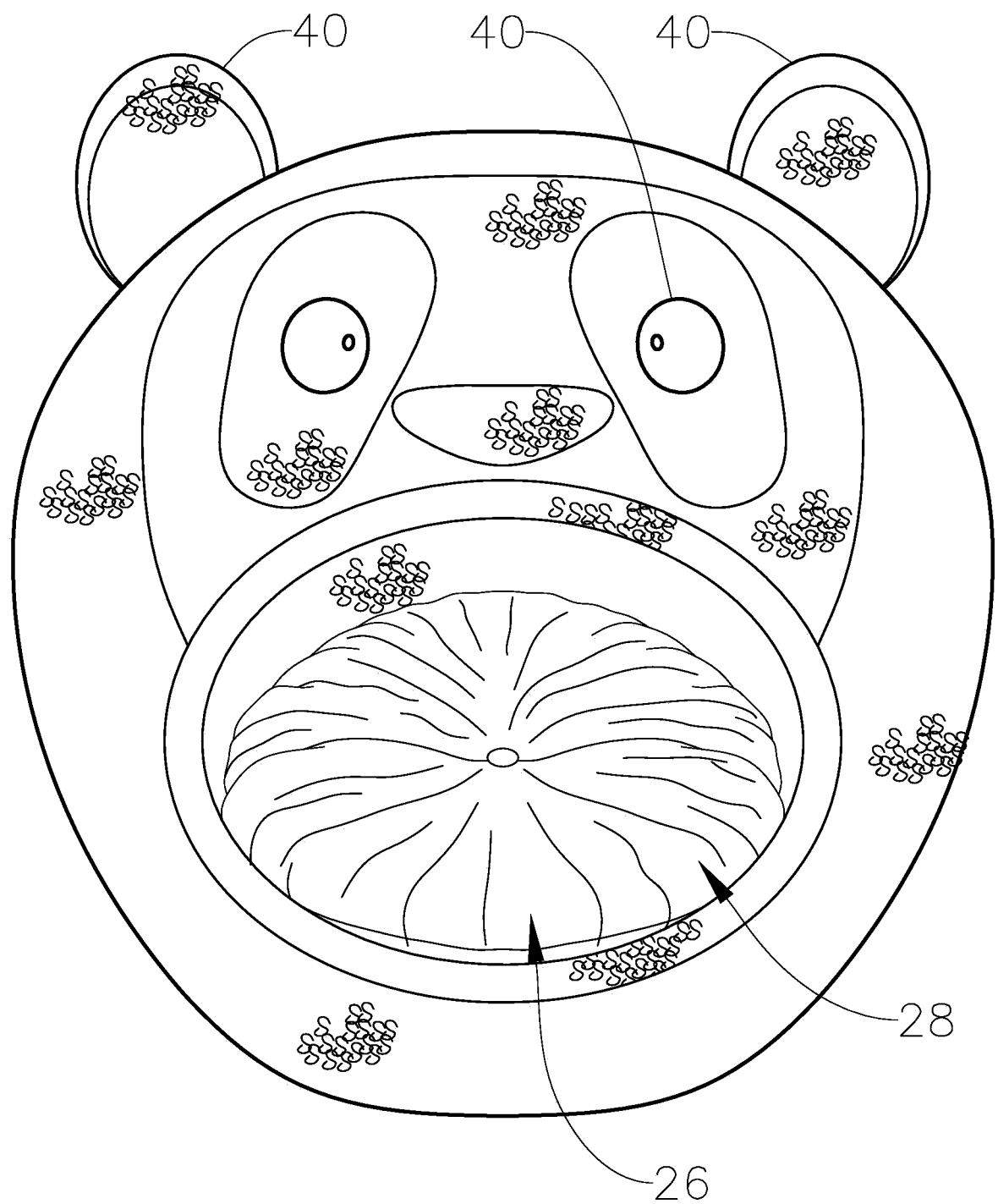
FIG. 9 is a front perspective view of a variant of the pet housing of FIGS. 1-8.

With continued reference to FIGS. 1-8, but especially to FIG. 8, the panels 16 each include an arcuate base 34, a first longitudinal edge 30 extending, along an arc, from one lateral end of the base 34 to a tip 38 proximate top end 18 of pet housing 10, and a second longitudinal edge 32 extending, along an arc, from an opposite lateral end of the base 34 to tip 38 proximate top end 18 of pet housing 10. Each panel has an outer surface 35 and an opposite inner surface 36.

Referring back to FIGS. 1-7, in particular, a plurality of seams 22 attach neighboring panels and contribute to the design of the outer surface 20 of the pet housing 10 when they are visible. In certain embodiments, pet housings made in accordance with the present invention can take on a variety of amusing shapes. For instance, a facsimile to sports-themed balls can be fabricated (e.g., a basketball). In certain embodiments, the seams 22 can approximate the look of the laces and/or seams of an associated sports ball (e.g., a baseball or a basketball). The material forming the outer surface 20 of the pet housing 10 may contain other indicia reminiscent of a physical ball (e.g., the grooves/dimples of a basketball) and can be made from the same fabric, or other material, that is uniformly applied to the entire outer surface 20 of the otherwise domed-shaped pet housing 10. In other words, the pet housing 10 can be given its outer appearance through a printed pattern on its outer surface 20. In alternate embodiments, a different material could be used for seams, grooves, laces and any other features that correspond to a real sports ball to give a more realistic tactile feel to the pet housing 10.

In an alternate embodiment, a pet housing similar to the pet housing 10 can itself resemble the head of an animal (see FIG. 9), in which case decorative accouterments 40 can be provided on the inner or outer surfaces of the housing. For instance, the accouterments 40 could include big ears, a poodle tail, etc. to mimic the pet who will use the bed or just to provide an extra decorative feature to the associated pet housing. The accouterments/attachments 40 can be removable and interchangeable and can be provided with the pet housing as a kit to decorate the outer and/or inner surfaces 35, 36 of selected panels 16, thereby enabling the associated pet housing to have a customizable appearance (see FIG. 9).

Similarly, the accouterments 40, or different stylized accouterments, could be applied to a ball-themed pet housing (see FIGS. 1-7). The ball-themed accouterments may vary from simple logos to more complex decorations (e.g., facial and uniform/hat features) adapted to mimic the look of a sports mascot, such as the "Mr. Met" mascot for the N.Y. Mets baseball team.

In an embodiment, the pet housing 10 can be collapsible or deformable, such as by virtue of being made from a soft, flexible material. To this end, a user can push down on the top end 18 of the dome-shaped pet housing 10 to reduce its height or otherwise completely compact the pet housing 10 for storage and/or transport. Further adaptations to enhance these goals and functionalities are naturally possible and fall under the purview of the present invention.

The pet housing 10 can be made of any number of fabrics capable of being sewn together, but it should be understood that other materials are possible: rubber, certain polymers and the like could be substituted. In an embodiment, a bottom surface 24 of the pet housing 10 can be made of a different material than the panels 14, 15 and 16. For instance, it may be desirable to use a material that is more resistant to friction and tears for the bottom surface 24, which will normally be in contact with the ground.

An optional cushion 26 (see FIGS. 8 and 9) can be disposed in an inner (i.e., interior) chamber 28 of the pet housing 10, which chamber 28 is sized and shaped to accommodate a pet of a particular type. The cushion 26 can be removable, or it can be one piece with the bottom surface 24 of the pet housing 10. In the aforementioned animal-head embodiment (see FIG. 9), the cushion 26 could, for example, correspond to the imitated animal's tongue. To provide further enjoyment to its animal user, the cushion 26 can be scented.

It will be understood that the embodiments described hereinabove are merely exemplary and that a person skilled in the art may make many variations and modifications without departing from the spirit and scope of the present invention. All such variations and modifications are intended to be included within the scope of the invention as defined in the accompanying claims.

What is claimed is:

1. A sports ball-themed pet housing, comprising:
an animal bed having a generally round shape adapted to be supported on a floor or similar surface;
a plurality of geometrically identical panels projecting from said animal bed and converging at an apex point to thereby form a roof above said animal bed, said panels and said animal bed cooperating to form a generally dome-shaped, hemispherical enclosure having an inner chamber adapted to house a pet animal, each and every one of said panels having an arcuate base extending continuously and laterally proximate said animal bed, a first longitudinal edge continuously extending, along a first uninterrupted arc, from one lateral end of said base to said apex point, and a second longitudinal edge continuously extending, along a second uninterrupted arc, from an opposite lateral end of said base to said apex point;
a printed pattern having a tactile feel assimilating that of a particular type of sports ball provided on each and every one of said panels, whereby said enclosure is sports ball-themed;
first means adapted to join adjacent pairs of said panels to each other, said first means constituting a feature of said particular type of sports ball to thereby complement said sports ball-themed enclosure;
second means adapted to join said panels to said animal bed; and
an opening in one, and in only one, of said panels, said opening being framed by said one panel and being sized and shaped to allow access to said inner chamber of said enclosure by a pet animal.

2. The pet housing of claim 1, wherein said first means includes seams assimilating the look of grooves on a sports ball.

3. The pet housing of claim 1, wherein said first means includes seams assimilating the look of seams on a sports ball.

4. The pet housing of claim 1, wherein said first means includes seams assimilating the look of laces on a sports ball.

5. The pet housing of claim 1, wherein said animal bed includes a cushion.

6. The pet housing of claim 1, wherein said animal bed is removable from said enclosure.

7. The pet housing of claim 6, wherein said animal bed is replaceable such that it can be interchanged with other animal beds.

8. The pet housing of claim 1, wherein said animal bed is permanently located within said enclosure.

9. The pet housing of claim 1, wherein each of said panels has a curved outer surface on one side thereof and a curved inner surface on an opposite side thereof, at least one of said surfaces of at least one of said panels having pet-identifying indicia thereon.

10. The pet housing of claim 9, wherein said pet-identifying indicia include the name of a pet animal.

11. The pet housing of claim 1, wherein said pet housing constitutes a component part of a kit that further includes detachable and replaceable accouterments for placement on said enclosure.

12. The pet housing of claim 11, wherein said accouterments include nose, eye, ear, fur and/or tail features of an animal are sports ball-themed.

13. The pet housing of claim 1, wherein said animal bed is scented.

14. The pet housing of claim 11, wherein said accouterments include facial features of a mascot for a sports team.

15. The pet housing of claim 11, wherein said accouterments include uniform features of a mascot for a sports team.

16. The pet housing of claim 1, wherein said enclosure is deformable for storage or transport purposes.

17. The pet housing of claim 1, wherein said enclosure is collapsible for storage or transport purposes.

18. The pet housing of claim 1, wherein said panels are made of rubber.

19. The pet housing of claim 1, wherein said panels are made of polymer.

20. The pet housing of claim 1, wherein said panels are made of fabric.

* * * * *